United States Patent
Lipczynski

(10) Patent No.: US 12,368,905 B2
(45) Date of Patent: *Jul. 22, 2025

(54) SECONDARY CONTENT DELIVERY

(71) Applicant: Comcast Cable Communications, LLC, Philadelphia, PA (US)

(72) Inventor: Michael Lipczynski, Holland, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 642 days.

This patent is subject to a terminal disclaimer.

(21) Appl. No.: 17/401,992

(22) Filed: Aug. 13, 2021

(65) Prior Publication Data

US 2022/0038754 A1 Feb. 3, 2022

Related U.S. Application Data

(63) Continuation of application No. 16/113,180, filed on Aug. 27, 2018, now Pat. No. 11,128,896.

(51) Int. Cl.
| | |
|---|---|
| *H04N 7/10* | (2006.01) |
| *H04N 21/2343* | (2011.01) |
| *H04N 21/236* | (2011.01) |
| *H04N 21/24* | (2011.01) |
| *H04N 21/258* | (2011.01) |
| *H04N 21/61* | (2011.01) |
| *H04N 21/64* | (2011.01) |

(52) U.S. Cl.
CPC ....... *H04N 21/2343* (2013.01); *H04N 21/236* (2013.01); *H04N 21/2407* (2013.01); *H04N 21/25883* (2013.01); *H04N 21/25891* (2013.01); *H04N 21/6125* (2013.01); *H04N 21/64* (2013.01)

(58) Field of Classification Search
CPC ............ H04N 21/2343; H04N 21/236; H04N 21/2407; H04N 21/25883; H04N 21/25891; H04N 21/6125; H04N 21/64; H04N 21/23614; H04N 21/26258; H04N 21/458; H04N 21/8586; H04N 21/812
USPC .......................................................... 725/35
See application file for complete search history.

(56) References Cited

U.S. PATENT DOCUMENTS

| | | | |
|---|---|---|---|
| 4,356,352 A * | 10/1982 | Hilliges | H04M 15/22 379/128 |
| 8,799,943 B1 | 8/2014 | Sherwin et al. | |
| 8,813,107 B2 | 8/2014 | Higgins et al. | |
| 9,082,092 B1 * | 7/2015 | Henry | A63F 13/335 |
| 9,479,801 B2 | 10/2016 | Higgs et al. | |
| 9,479,807 B1 | 10/2016 | Bugajski et al. | |
| 9,613,042 B1 | 4/2017 | Joseph et al. | |

(Continued)

*Primary Examiner* — Timothy R Newlin
*Assistant Examiner* — Sahar Aqil Riaz
(74) *Attorney, Agent, or Firm* — Banner & Witcoff, Ltd.

(57) ABSTRACT

Described herein are systems, methods, and apparatuses for secondary content delivery via a network. A data stream carrying, for example, a primary content may also carry a network address of a schedule that indicates one or more times at which secondary content should be presented in coordination with the primary content. A user device may receive this data stream, and use it to obtain the secondary content and to present it with the primary content. The user device may also determine whether the schedule has changed by comparing a received network address with a previously-received network address.

41 Claims, 7 Drawing Sheets

(56) References Cited

U.S. PATENT DOCUMENTS

| | | |
|---|---|---|
| 9,654,539 B2 | 5/2017 | Falvo |
| 9,686,332 B1* | 6/2017 | Binns .................... H04L 65/612 |
| 9,710,469 B2 | 7/2017 | Chen |
| 9,712,860 B1 | 7/2017 | Waggoner et al. |
| 9,712,889 B2 | 7/2017 | Zhu et al. |
| 9,723,047 B2 | 8/2017 | Van Brandenburg et al. |
| 9,723,049 B2 | 8/2017 | De Vleeschauwer et al. |
| 11,019,300 B1* | 5/2021 | Baxendale ....... H04N 21/47815 |
| 11,128,896 B2* | 9/2021 | Lipczynski ........ H04N 21/2407 |
| 11,930,254 B2* | 3/2024 | Sodagar ................ H04L 65/403 |
| 2004/0043770 A1* | 3/2004 | Amit ..................... H04L 67/565 |
| | | 455/450 |
| 2004/0077347 A1* | 4/2004 | Lauber .................... H04L 67/52 |
| | | 340/907 |
| 2006/0007821 A1 | 1/2006 | Takashima |
| 2007/0288950 A1* | 12/2007 | Downey .......... H04N 21/25883 |
| | | 725/9 |
| 2008/0008447 A1 | 1/2008 | Iwase et al. |
| 2009/0287567 A1* | 11/2009 | Penberthy ............... G06F 16/00 |
| | | 705/14.54 |
| 2010/0251278 A1 | 9/2010 | Agarwal et al. |
| 2011/0246616 A1 | 10/2011 | Ronca et al. |
| 2012/0114302 A1 | 5/2012 | Randall |
| 2013/0163758 A1 | 6/2013 | Swaminathan et al. |
| 2014/0052770 A1 | 2/2014 | Gran et al. |
| 2014/0150019 A1* | 5/2014 | Ma ....................... H04N 21/458 |
| | | 725/34 |
| 2014/0379871 A1* | 12/2014 | Van Brandenburg ... H04L 65/65 |
| | | 709/219 |
| 2015/0082297 A1* | 3/2015 | Parry ....................... G06F 8/65 |
| | | 717/173 |
| 2015/0256581 A1* | 9/2015 | Kolhi ................. H04N 21/2662 |
| | | 709/219 |
| 2015/0271234 A1 | 9/2015 | O'Malley et al. |
| 2016/0127440 A1* | 5/2016 | Gordon ............ H04N 21/23439 |
| | | 709/219 |
| 2016/0269771 A1 | 9/2016 | Bangma et al. |
| 2016/0316233 A1 | 10/2016 | Ghadi et al. |
| 2017/0201651 A1 | 7/2017 | Sugiyama et al. |
| 2017/0353516 A1 | 12/2017 | Gordon |
| 2018/0007148 A1 | 1/2018 | Nielsen et al. |
| 2018/0095833 A1 | 4/2018 | Slater et al. |
| 2018/0121452 A1 | 5/2018 | Anguiano |
| 2018/0150548 A1 | 5/2018 | Shah et al. |
| 2019/0068673 A1 | 2/2019 | Giladi et al. |
| 2019/0379719 A1 | 12/2019 | Lohmar et al. |
| 2020/0045266 A1* | 2/2020 | Archer, III ............. H04N 7/162 |

\* cited by examiner

SECONDARY CONTENT DELIVERY

CROSS REFERENCE TO RELATED APPLICATIONS

This application is a continuation of U.S. application Ser. No. 16/113,180, filed Aug. 27, 2018 the entire contents of which is incorporated herein by reference.

BACKGROUND

Various streams of content, such as television programs, movies, Internet videos, etc. may be transmitted from local offices to user locations (e.g., from the local cable headend to the individual user homes). In many cases, a particular stream of content (e.g., a television program airing on the National Broadcasting Company (NBC) network) may actually include several different pieces of content from different sources (e.g., a television program from one source, a first commercial from another, a second commercial from yet another, etc.). The local office may employ dedicated transcoder equipment to receive the content from those sources and combine the content to produce the streams, but that equipment can sometimes be costly and can also sometimes introduce errors into the streams.

SUMMARY

Systems, apparatuses, and methods are described herein to allow user devices to obtain various pieces of content from different sources, and to combine them into a single presentation, thereby handling some or all of the functionality that was previously handled at the local office. The end user devices may receive a stream of primary content, and may also receive, embedded in the stream of content, address information for a schedule of secondary content that should be presented with the primary content. The schedule may be a manifest file, and may indicate network storage locations of the secondary content, times that the secondary content should be played, type information about the secondary content, and various other parameters. The address for the schedule may be periodically and/or repeatedly transmitted throughout the stream of the primary content.

A user device may monitor the primary content stream and detect the manifest file address information. For example, the address may be carried in a beacon stream that is an elemental data stream of an MPEG (Moving Picture Experts Group) stream for a particular service or piece of content, and the user device may be configured to react to that beacon stream in a variety of ways. The user device may compare the received address with a previously-received address, to determine if the newly-received address is different from a previously-received address. The change in address may indicate that the manifest file has been updated. The user device may then send a request to the new address, to obtain the updated copy of the manifest file, and may use the new manifest file to determine the latest schedule of secondary content. The manifest file may indicate, for example, times at which a secondary content should be presented, sources of the secondary content, and/or other information regarding the secondary content.

A secondary content server may prepare the manifest file for a particular primary content and its associated secondary content, and may periodically update the manifest file if schedules are changed, advertising videos are changed, removed, or added, or for any other desired reason. The secondary server may store the updated manifest file at a different address location from a previous version of the manifest file, to signal to user devices that the manifest file has changed. The secondary content server may prepare customized manifest files tailored to any desired end user device and/or primary content. Different manifest files may be prepared for different geographical regions, different subsets of user demographics, different times, different content services, different primary content items, or any of a variety of other subsets of user devices and/or primary content.

These and other features and advantages are described in greater detail below. The preceding summary presents a simplified summary of certain features. The summary is not an extensive overview and is not intended to identify key or critical elements.

BRIEF DESCRIPTION OF THE DRAWINGS

Some features herein are shown by way of example, and not by way of limitation, in the figures of the accompanying drawings and in which like reference numerals refer to similar elements.

DETAILED DESCRIPTION

Figure 1:
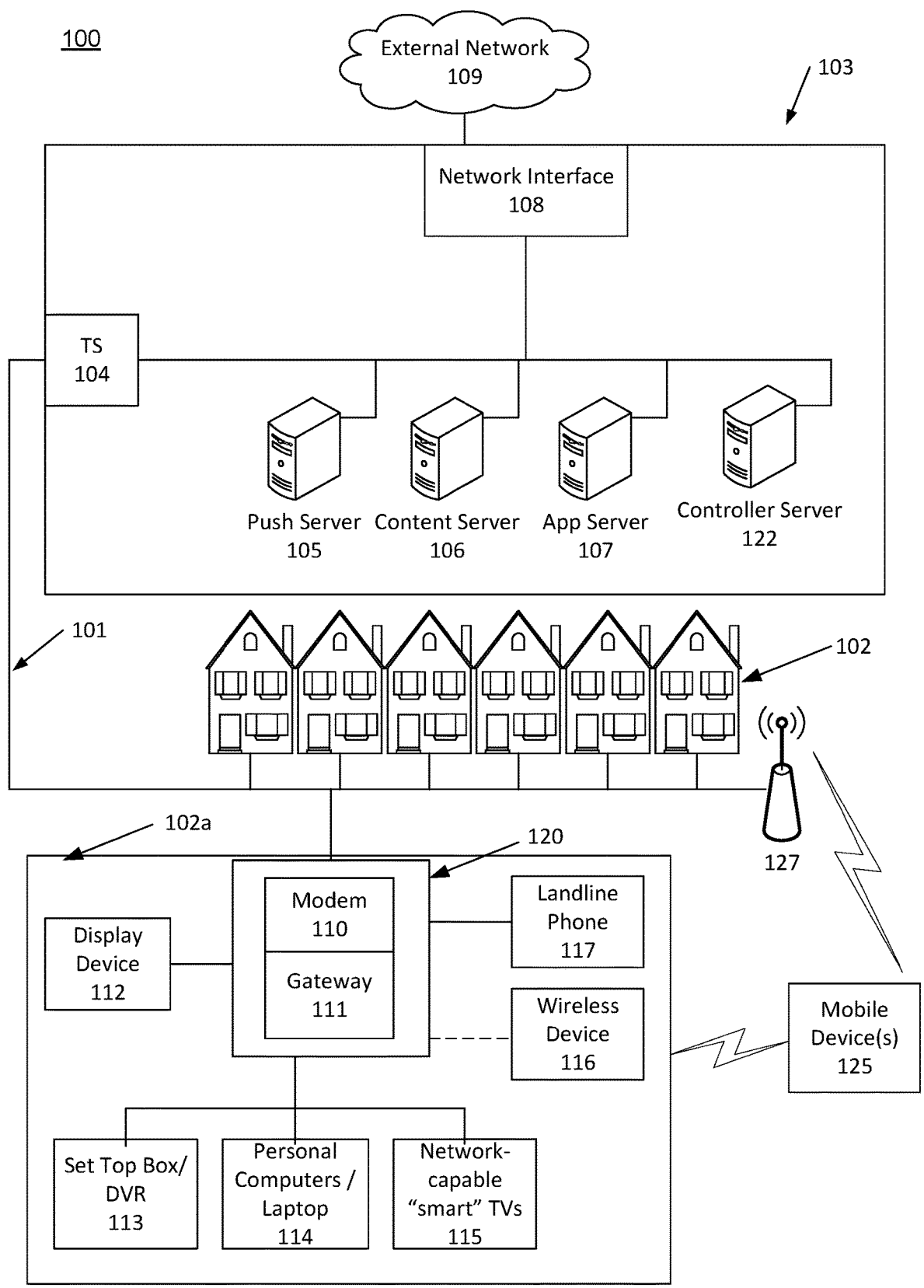
FIG. 1 shows an example communication network in which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include components not shown, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107 and 122. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program listings. Another application server may be responsible for monitoring user viewing habits and collecting that information for use in selecting advertisements. Yet another application server may be responsible for formatting and inserting advertisements in a video stream being transmitted to the premises 102 (e.g., this application server may also be configured to perform some or all of the functions shown in FIG. 7 below). The local office 103 may include additional servers, including a controller server 122 (described below), additional push, content, and/or application servers, and/or other types of servers. Although shown separately, the push server 105, the content server 106, the application server 107, the controller server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, network-capable "smart" TVs with embedded processors, and/or any other desired computing device. The gateway interface device 111 may also include local network interfaces to provide communication signals to requesting entities/devices in the premises 102a, such as display devices 112 (e.g., televisions), additional STBs or DVRs 113, personal computers/laptop 114, network-capable "smart" TVs, 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), wireless "smart" TVs, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the controller server 122. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
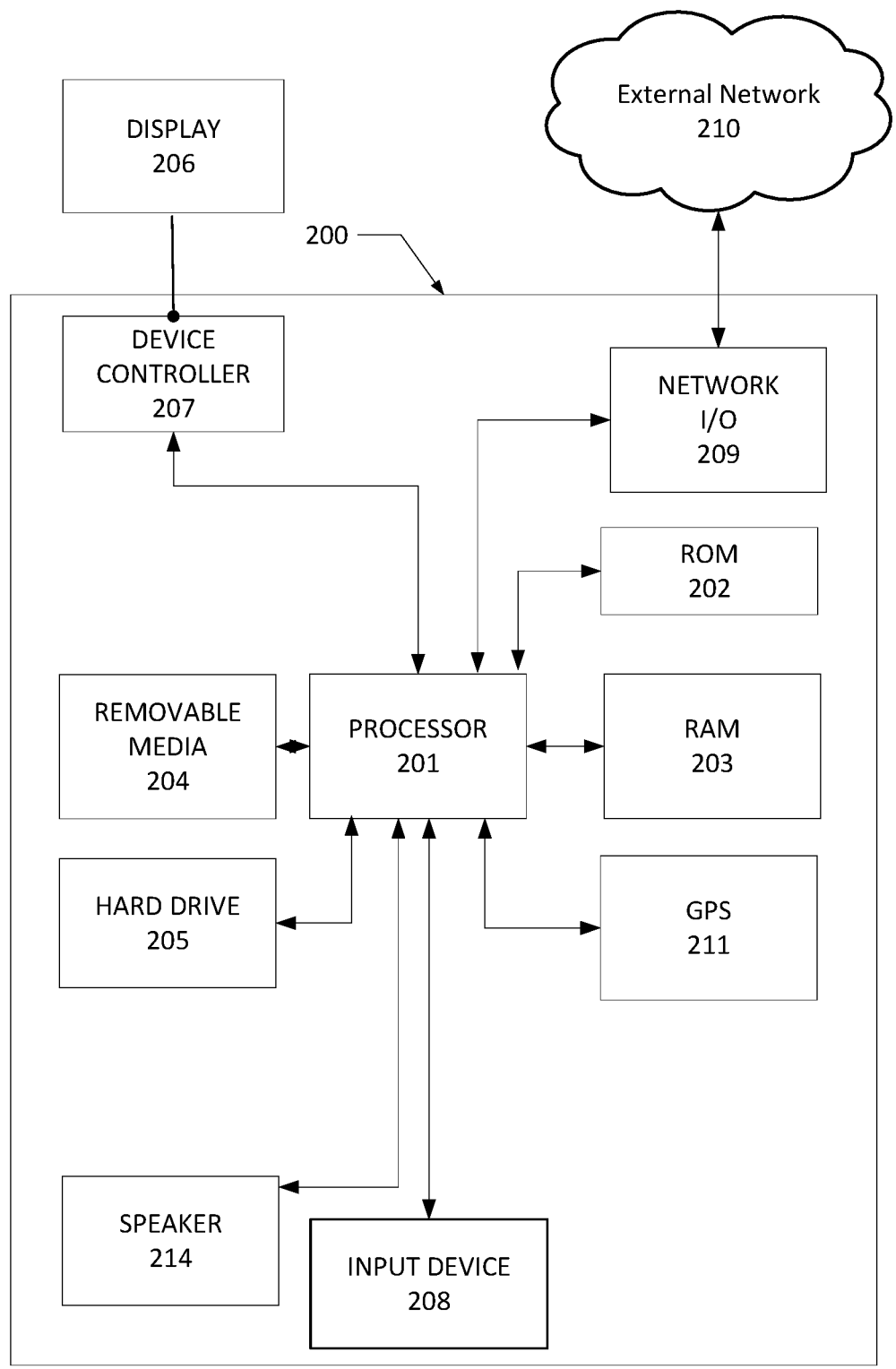
FIG. 2 shows hardware elements of a computing device that may be used to implement any of the elements described herein.

FIG. 2 shows hardware elements of a computing device that may be used to implement any of the computing devices discussed herein (e.g., the servers, devices, a controller server, end user device, receiving computing device, etc.). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
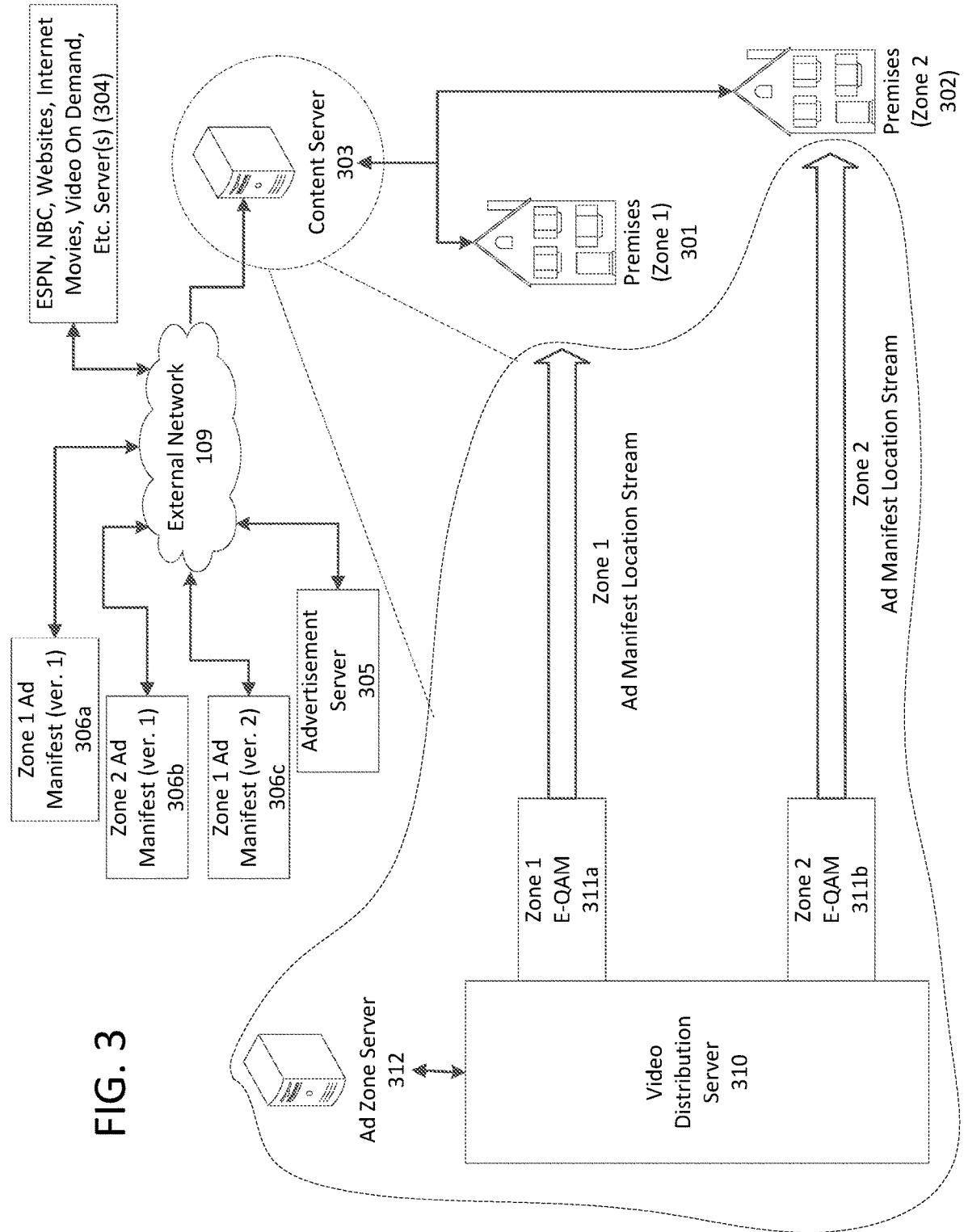
FIG. 3 shows an example of the network shown in FIG. 1, with additional elements for primary and secondary content delivery.

FIG. 3 shows an example system for delivery of primary and secondary content. Each of these may be any desired type of data, such as movies, audio and/or video programs, advertisements, emergency notifications, interactive pages (e.g., Internet or web pages), or any other desired audio and/or video content. There may be multiple premises, such as premise 301 and premise 302, which may each be a premise 102a as shown in FIG. 1. The premises 301 and 302 may be located in different geographic zones. For example, premise 301 may be located in downtown Philadelphia, Pennsylvania, while premise 302 may be located in a suburb of Philadelphia, such as Germantown. These premises (and the devices within—not shown in FIG. 3) may be connected to one or more content servers 303, which may be a content server 106 as shown in FIG. 1. The various user devices (not shown) in the premises 301 and 302 may receive various content from the content server. For example, laptop computers, set-top boxes, DVRs, smartphones, and other computing devices at the premises 301 and 302 (e.g., devices 110-117 in FIG. 1) may receive Internet data, web sites, audio and/or video content streams (e.g., NBC, ESPN, Video on Demand), and any other desired data, from the content server 303. As illustrated, the content server 303 may in turn receive this content from one or more other sources 304 via one or more external networks 109.

The user devices at the premises 301 and 302 may receive primary and secondary content from the content server 303. Primary content may be any desired piece of content, such as a movie or television program that a user is watching. The secondary content may be, for example, any content that supplements or accompanies the presentation of primary content, such as a commercial advertisement.

The user devices may obtain the primary and secondary content from different sources. For example, while one video server 304 may provide the video of a television program that a user is watching on their laptop, a separate advertisement server 305 may provide one or more video advertisements that are to be played to the user in commercial breaks in the television program.

Figure 4:
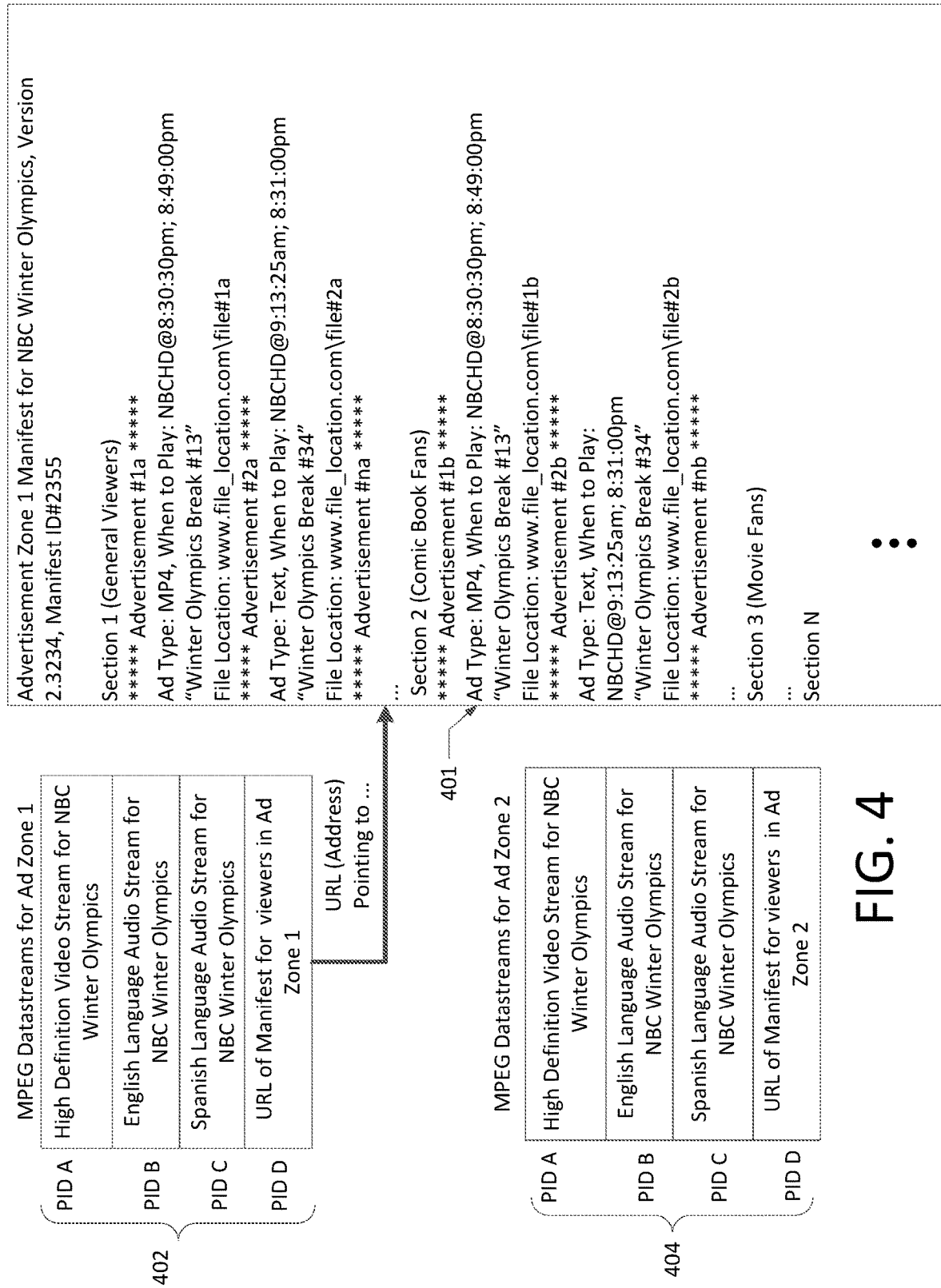
FIG. 4 shows an example MPEG data stream, including beacon data streams for advertising zone manifest files.

To retrieve and assemble these primary and secondary contents for presentation to the user, the user device may employ a schedule, or manifest file. In a general sense, a manifest file may correspond to a primary content, such as a particular content stream (e.g., a service such as NBC) or content item (e.g., a particular movie), and may indicate a schedule of secondary content for presentation accompanying that primary content. The manifest file may indicate a variety of advertisement content, and for each one the manifest file may indicate the type of advertisement (e.g., video file, web page, audio file, etc.), one or more network address locations where the advertisement content (e.g., its video files, audio files, data, etc.) can be found, one or more time(s) the advertisement should be presented to the user, and other parameters regarding presentation of the advertisement as secondary content to accompany the primary content that the user is watching. Different manifest files may be generated for different geographic zones, such as the zones discussed above. Different manifest files may also be generated for various other demographic types, such as device types (e.g., one manifest file for tablet computers, another for laptop computers, and yet another for DVRs, etc.) or user categories (e.g., user demographics such as income level, individual user preferences, user hobbies, gender, race, etc.). FIG. 4 shows an example manifest file 401.

The example manifest file 401 may correspond to a particular service (e.g., NBC), and may include a title/name, version number, manifest file identification number, and/or information for a variety of secondary content items that are to accompany the presentation of content being aired on NBC. The times at which a secondary content item is to be presented with (or instead of) a primary content item may be insertion opportunities. The example manifest file 401 may indicate a first advertisement as being of type "MP4", and that it is to be played on the service (e.g., channel) NBCHD at 8:30:30 pm, and again at 8:49:00 pm. Although the timing information may be indicated by service and time of day, other indications are possible as well. For example, the example manifest file 401 also indicates that, for general viewers in Ad zone 1, Advertisement #1a is to be played at break #13 during the program "Winter Olympics," and the times could be relative to the beginning of the primary content item (e.g., 12 minutes after starting the program; or at play counter position XX, etc.). The manifest file may also indicate one or more locations (e.g., local or remote network addresses, directories, etc.) where files (e.g., video data, audio data, metadata, etc.) for the secondary content may be found. In the example 401, files for Advertisement #1a may be found at the URL http://www.file location.com/file-1a. As shown in FIG. 4, the manifest file 401 may include multiple entries for multiple pieces of secondary content (e.g., Advertisement #2a, Advertisement #na, etc.). The manifest file may include a schedule of secondary content for a duration of the service (e.g., 2 hours ahead of the current time on NBC) and/or the primary content (e.g., a manifest file for an entire duration of tonight's episode of a program, or an entire movie, etc.). As time progresses, the ad zone server 312 (or other device) may generate a new manifest file covering a new time duration or primary content.

The manifest may be pre-fetched and provide information about the advertisements that are local to an Ad Zone. The local ad insertion may occur on local services and a general advertisement insertion for a more general audience may occur on national services. The processing capacity of user devices may permit for a just-in-time fetch of the advisements and the user devices may not need to download all possible advertisements on the services. For example, if the user is watching a local NBC station, the user device may download the corresponding advertisement within 2 to 5 seconds before it is to be displayed.

Manifest files may be customized in many ways. For example, FIG. 4 shows one example manifest file (PID D) that may be a manifest file for the presentation of advertisements (or other secondary content) to be shown to viewers who are watching NBC Winter Olympics. That manifest file includes Section 1, which may be intended for general audiences, and may include advertisements that are selected for general audiences. An alternative Section 2 in the manifest file may be generated for the same program, and may instead contain different advertisements that may be selected for a more specialized/targeted audience. For example, FIG. 4 shows the manifest file (Section 2) that is for the same program ("Winter Olympics") and on the same service (NBC), but for a targeted audience of comic book fans. The alternative sections in the manifest file may include additional or alternative commercials deemed to be of interest to comic book fans, and which may be different from the secondary content in the "general interest" section of the manifest file for the program. For example, Section 2 of the manifest file 401 includes Advertisement #1b and #2b targeted for comic book fans. During the configuration in Step 601, the user device may be informed as to the preferences of the user (e.g., by the user logging in, or by prompting the user to choose a secondary experience), and the user device may then determine which section in the manifest file to process for the secondary experience beacon stream.

The URL for the manifest may be localized to an Ad Zone (Ad Zone 1 and Ad Zone 2). The manifest file in each Ad Zone, may contain alternative sections, with each section offering different advertisements for a specialized or targeted audience. This "micro zoning" mechanism may be associated with an IP address of a user device. For example, based on the demographic data and user preferences, a user profile may be established and the advertisements may be pulled to the user device based on the user profile.

The user devices at the premises 301 and 302 may obtain the manifest file by retrieving it from one or more manifest storage locations 306a-c via one or more external networks 109, as shown in FIG. 3. As shown in FIG. 3, there may be a first version of a Zone 1 advertisement manifest stored at location 306a, and a first version of a Zone 2 advertisement manifest file stored at location 306b. There may also be a second, newer, version of a manifest file stored at a different location 306c. These different locations 306a-c may have different network addresses, such as different URL addresses, file folder locations, etc. (although they may be stored on the same physical device). New manifest files may be created after, for example, an advertising schedule is changed, or a new piece of secondary content is to be added.

In order to know where the manifest file(s) are found, the user devices may monitor an incoming beacon data stream. The beacon data stream may be transmitted on a well-known PID and may be transmitted in-band along with programming. The PID may be transmitted on all frequencies and therefore may be detected regardless of the program the user is watching. The URL of the manifest file, carried in the PID, may differ based on the Ad Zone. The beacon stream may be, for example, an MPEG elemental stream that is transmitted along with the other elemental data streams for a particular program or service, and may be part of an overall MPEG transport stream for that program or service. FIG. 4 shows an example in which an overall MPEG transport stream 402 comprises a plurality of elemental data streams that may carry the components of a program or service. In practice, a user may sit down to watch the Winter Olympics on NBC, and may set their laptop to receive the NBCHD service carrying that program. The user device would then tune to/receive the overall data stream (402) carrying that program, and may begin to identify and process the various elemental data streams for that program. Packets in an MPEG transport stream may include, in their headers, a packet identifier (PID) field that may identify the packet as belonging to a particular elemental stream. The different elemental data streams may be carried in data packets having different PIDs, and the PID may be used to refer to the particular elemental stream. In the FIG. 4 example, the elemental streams may include different PIDs for carrying high definition video for NBC (PID A), English language audio for NBC (PID B), Spanish language audio for NBC (PID C), and address information (e.g., a URL) for a manifest file for advertisement Zone 1 (PID D) or a manifest file for advertisement Zone 2 (PID D). The MPEG streams may contain different URLs for multiple different manifest files, for example corresponding to different advertisement zones, user demographics, device types, etc. Similar sets of MPEG data streams (not shown) may be transmitted for other video services (e.g., ESPN, HBO, etc.) and/or individual programs (e.g., manifest files for a presentation of the movie "Star Wars" on a particular service such as HBO in using a well-known PID, such as PID D, described further below).

As shown in FIG. 3, the manifest file location streams discussed above (e.g., PID D) may be transmitted to the premises 301/302 from a video distribution server 310 (which, again, may be the content server 303 or an associated device). The video distribution server 310 may use separate Quadrature Amplitude Modulation (QAM) devices 311a-b (or "edge" QAMs) to transmit the various MPEG streams shown in FIG. 4. Each QAM may handle transmitting all of the MPEG data streams carrying a particular service stream, such as NBC, or a particular program, such as the NBC Winter Olympics program example in FIG. 4 (using PIDs A-C).

FIG. 3 also shows an advertisement zone server 312. The advertisement zone server 312 may handle preparation and updating of the various manifest files, and may store those files at the various locations 306a-c discussed above. The advertisement zone server 312 may also store the secondary content assets (e.g., video files for an advertisement) at the advertisement server 305, and may also provide the manifest file location information (e.g., URLs, network addresses, etc.) to the video distribution server 310 for ultimate transmission to the premises 301/302 via the manifest location streams (e.g., PID D).

Figure 5:
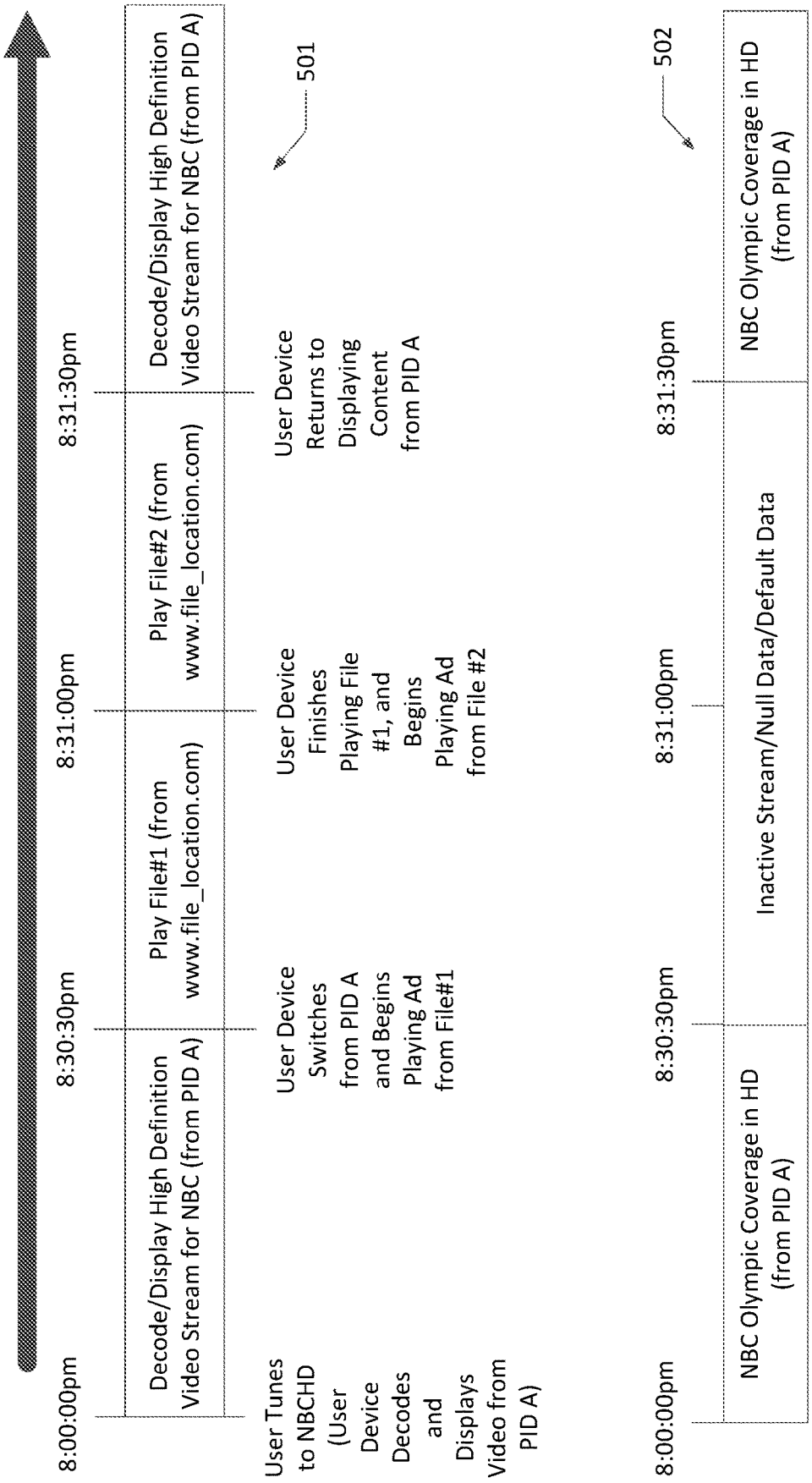
FIG. 5 shows an example timeline in which primary and secondary content may be presented via a user device.

FIG. 5 shows an example timeline 501 of events for a user watching the Olympics on NBC. The user may set a user device (e.g., laptop, DVR, set-top box, smartphone, etc.) at 8:00:00 pm to the NBCHD service, to watch the Olympic Games in high definition. The user's device may tune to the MPEG streams carrying the various components of that service (e.g., audio, video, secondary content manifest file address info, etc.), and may begin to decode and present that program to the user for viewing (e.g., by identifying and decoding the video content on PID A and the audio content on PID B). The user device may monitor the secondary content manifest file address stream (e.g., the beacon stream—PID D if the user is in zone 1), and may use it to identify the location of the current secondary content manifest file 401, and to retrieve it from the listed address. The manifest file 401 indicates that at 8:30:30 pm, the primary content (the Olympic games program) is to be interrupted by a presentation of Advertisement #1a. So, at 8:30:30 pm, the user device may play the audio/video from advertisement file #1a, which it may have previously retrieved from the location (www.file_location.com\file #1a) indicated in the manifest file 401, instead of presenting the Olympic games program. Given that a well-defined PID may be broadcast on all frequencies, regardless which services they may be tuned to, the user devices may detect a change in the contents of that PID. In some examples, the user devices may monitor specific data PIDs while processing video, and voice PIDs. The user devices may process the well-defined PID (such as PID D) several times per second to ensure that the manifest file has not changed. Additional details of this retrieval operation will be discussed below, with respect to FIG. 6.

Since manifest file 401 also indicates that Advertisement #2a is to be presented at 8:31:00 pm, the user device may follow that schedule, and may play file #2a beginning at that designated time. After file #2a is completed, if the manifest file does not indicate any further secondary content to be presented, the user device may return to decoding and presenting the primary content from the MPEG streams (e.g., the Olympic games program).

At the bottom of FIG. 5 is a second timeline 502, showing the contents of the primary content stream (e.g., PID A) for the above example. Since there is a commercial break between 8:30:30 pm and 8:31:30 pm, that MPEG stream (PID A) may become inactive during that time, or it can carry null data to maintain connection resources. The advertisements may be stored a file on the user devices that may be fetched based on the instructions in the manifest file, and the user devices may insert the advertisements at the commercial break.

Figure 6:
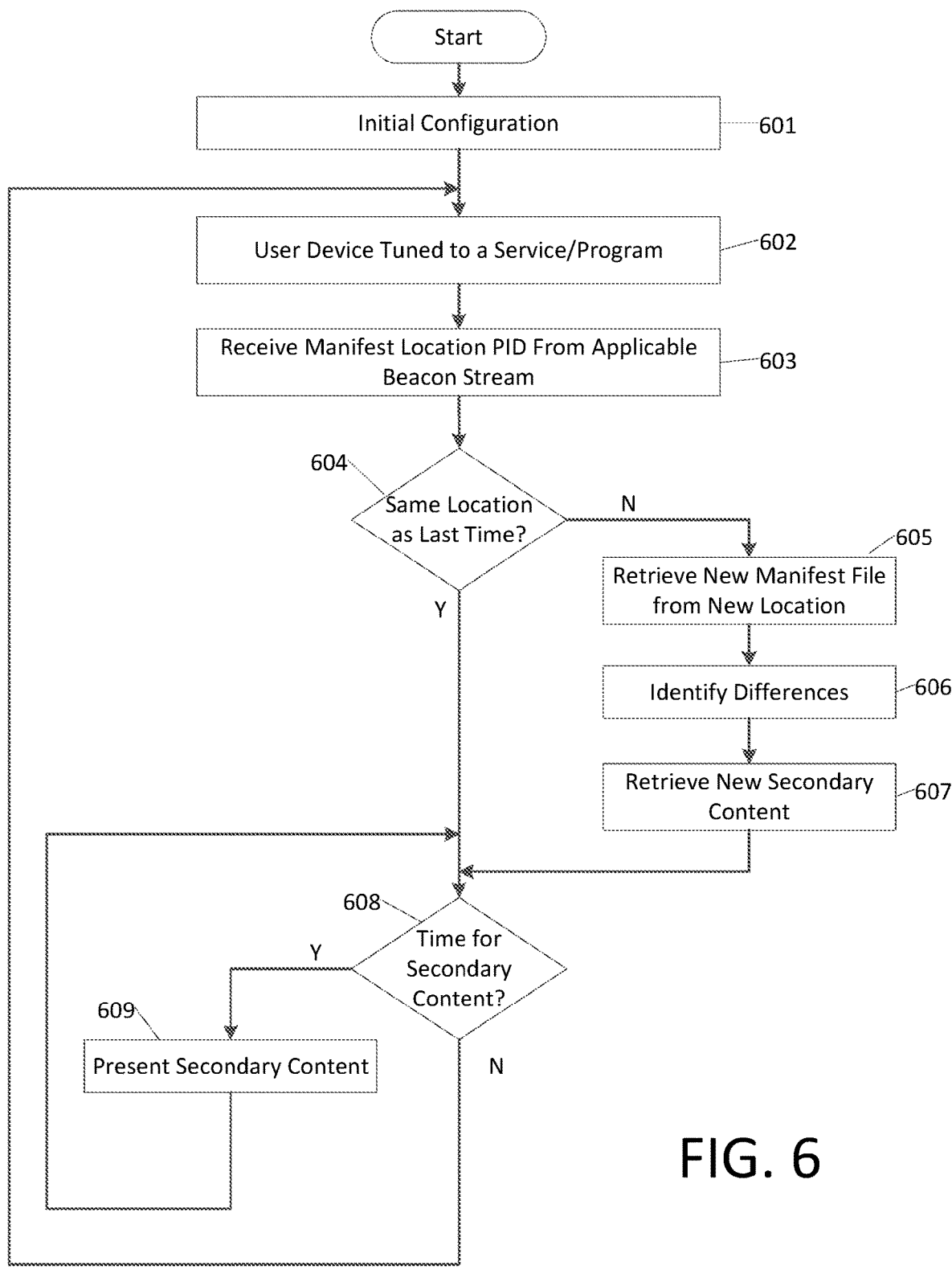
FIG. 6 shows an example algorithm that may be performed by a user computing device to implement the presentation of primary and secondary content.

FIG. 6 illustrates an algorithm that may be carried out by a user device to present the primary and secondary content as discussed above. Beginning in step 601, the user device may be configured for operation. This configuration may entail a variety of steps depending on the device type. For example, a set-top-box or DVR may establish initial communications with the local office 103, and may begin communicating with the content server 303 (or other element). The user device may be provisioned for service (e.g., exchanging authentication credentials to access content from content server 303), and in doing so the user device may receive and store information indicating the advertisement zone to which the user device is assigned. The user device may be assigned to a "micro zone" based on user preferences associated with the IP or MAC address of the user device. For example, there may be 5 sections for an advertisement insertion opportunity in the manifest for an advertisement zone. The user device may pull Section 3 of the manifest because the user device's IP is associated with profile 3. The profiles may be delegated to the user devices based on the user's viewing history and the user's preferences/choices selected by the user.

The configuration may include configuring the user device to identify one or more predetermined types of manifest files to track. For example, the user device may be configured to identify the manifest file location beacon(s) that correspond to the advertisement zone to which the user device is assigned. The user device may also be configured with device or user preferences. For example, a user may prefer to view primary content in high definition, and may configure the device to look for the manifest file of a high-definition version of the primary content (e.g., if a particular movie has two different manifest files, one for a high-definition version and one for a standard definition version, the user device may default to tracking the high-definition one). As noted above, a user may have a particular interest (e.g., comic books), and through the configuration process the user device may be informed of this interest.

In step 602, the user device may be tuned to a particular service or program. For example, the user may have selected to watch NBC on their DVR program guide, or they may have initiated a video on demand download of a particular movie. After the user makes such a selection, the user's device may tune to (e.g., receive, decode, etc.) one or more MPEG data streams carrying the primary content. The user device may also, in step 603, identify, decode, and monitor one or more manifest location beacon streams (e.g., PID D), to obtain the current location information for the manifest file that is applicable to the primary content being watched. In receiving the appropriate beacon stream, the user device may employ the user information noted above in step 601. So, for example, if the user information indicates that the user is in Zone 2, then the user device may determine the address of the manifest file corresponding to Zone 2. Similarly, if the user is determined to have a particular preference, then the preference information may be used to determine the most appropriate section in the manifest file. In some situations, there may be multiple sections in the manifest files that apply to a particular user's information (e.g., a Zone 2 manifest file plus a specific interest section), and in such situations the user device may determine a section of the manifest that is most appropriate. For example, manifest files may be created with an indication as to their specificity, and more specific sections in the manifest files may be selected over less specific ones—so, for example, a "general interest" section in the manifest file would be set aside in favor of a more specific "sports fan-specific" section in the manifest file if the user information indicates a matching preference.

In step 604, the user device may compare the newly received manifest file location (e.g., http://www.manifestlocation.com/file-1 against the address of the most recently-received version of the applicable manifest file (e.g., the user device may store the address of each manifest file that it downloads), to determine if the location has changed since the last location was received. If this is the first time for the user device, and there is no previously-received version, then the new location will be considered changed because the previously-received location will be empty or a default value. If the new manifest file location is different from the most recently-received version of that location information (e.g., http://www.manifestlocation.com/file-2 instead of http://www.manifestlocation.com/file-1), then the user device may act on the new manifest file location, and proceed to step 605.

In step 605, the user device may access the new manifest file location (e.g., sending an HTTP HyperText Transport Protocol—request to http://www.manifestlocation.com/file-2) to request the new manifest file. The user device may receive the new manifest file, and then in step 606, the user device may examine the new manifest file to identify differences. For example, the user device may determine whether any new secondary content items (e.g., advertisements) have been added since the previous version of the manifest file, and/or if any previously-listed secondary content items have been removed or changed. For any new secondary content items, the user device may send requests, in step 607, to the corresponding locations of the new secondary content items, as indicated by the new items' entries in the new manifest file. The user device may store the new secondary content items in, for example, local storage 205, to be used at the appropriate time during presentation of the primary content (as will be discussed below).

In step 608, the user device may consult the manifest file(s) for the currently-viewed primary content, and determine whether the time has arrived to present any secondary content. For example, in the FIG. 5 timelines, the user device may determine at 8:30:30 pm that it is time to play the File #1 obtained from the www.file_location.com location. In implementation, this determination may be performed a predetermined time before the actual time the secondary content is to be displayed, so that the user device may have some time to prepare the necessary secondary content and handle any other preparations that may be needed for presenting the secondary content.

If it is time to present secondary content, then in step 609, the user device may switch from presenting the primary content to presenting the scheduled secondary content. For example, at 8:30:30 pm in the FIG. 5 example, the user device may cease displaying content from PID A (the video from NBC), and may instead begin playback of File #1, which would have been downloaded from www.file_location.com/file-1 in step 607. After the secondary content is complete, the user device may return to step 608 to determine whether another secondary content should be presented. This process may repeat until, for example, the currently-scheduled commercial break is over, and the listed advertisements in the manifest file are played according to their schedules.

If it is not time to present secondary content, then the process may return to step 602, and may repeat as described above.

Figure 7:
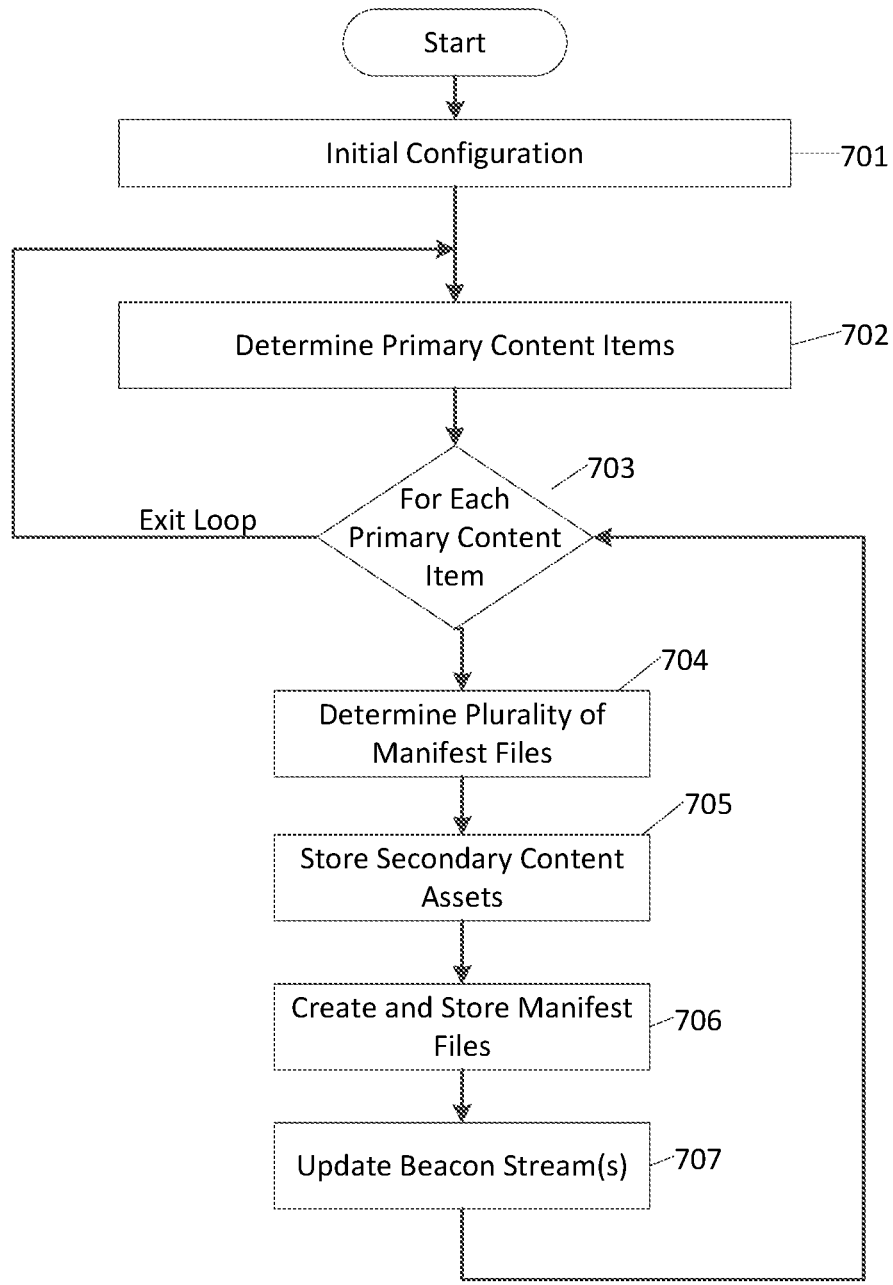
FIG. 7 shows an example algorithm that may be performed by a server to support the user computing device features shown in FIG. 6.

FIG. 7 illustrates an example algorithm that may be performed by content server 303 and/or video distribution server 310 and/or advertisement zone server 312, to prepare and update manifest file information in the content delivery network. At step 701, the server may perform initial configuration. The initial configuration may include, for example, determining the various sources of primary content in the content delivery network, the types of content steams that will be supported, the geographic zones to be supported by the server, etc.

In step 702, the server may determine the various primary content items that will be supported. This may include determining the service or channel lineup, as well as the various individual programs, that will be offered according to a predetermined schedule (e.g., the various television channels to be made available). This may also include determining on demand content, such as pay-per-view movies and other video assets that are available for download upon user request.

In step 703, the server may begin a loop for each of the primary content items identified in step 702. In the loop, the server may determine (704) the plurality of different manifest files that will be provided for the primary content item. This may be done, for example, by a system administrator, and may entail identifying the different advertisement zones, user demographics, user preferences, and user device types that will be given a specific secondary content experience. For example, users in one ZIP code may see different advertisements from users in another ZIP code, so different manifest files may be created for those different geographic areas/ad zones.

In step 705, the server may obtain and store the various assets for the secondary content. This may include, for example, populating advertisements on advertisement servers 305, and/or storing content to servers 304.

In step 706, the server may create the various manifest files determined in step 704, adding the network address locations where the secondary content assets were stored in step 705. The server may store the various manifest files in their respective locations (e.g., 306*a-c*). If a new manifest file is created to replace an older version, the new manifest file may be stored in a different location instead of overwriting the older one in its current location. By storing the new manifest file in a new and different location from its prior version, recipient user devices may infer that the file has been updated. The server may maintain the previous version for a predetermined amount of time (e.g., 10 minutes), and/or a predetermined number of revisions (e.g., maintain the last 3 versions), and may subsequently delete the outdated manifest files.

In step 707, the server may update the relevant beacon streams to indicate the current addresses for the manifest files created in step 706. This may include assigning each manifest file to a PID to accompany the primary content, and/or updating the network address information in an existing PID carrying the previous version of the manifest file (in the case of a manifest file update). When the manifest files for all of the primary content items have been prepared and sent/updated on the data streams (e.g., the MPEG streams discussed above), the process may return to step 702 to repeat again in case there are any updates to the primary content items and/or their secondary content manifests.

The above discussion of examples is merely intended to provide examples, and many variations may be made. For example, while FIG. 4 shows each different manifest file address assigning to a single PID in an MPEG stream, the various manifest file locations need not be arranged in that way. For example, multiple manifest file addresses may have its own PID. The addresses may include some information identifying the type of manifest file to which it belongs (e.g., a manifest file number or code, or textual name, etc.), and the user devices may simply obtain the packets in that PID and look for a matching manifest file type before comparing the address. For example, the secondary content may include advertisements that are played during breaks in the primary content. The secondary content may also include other contents such as interactive web pages, or overlays that may not require a break in the primary content. For example, if the user's profile indicates a user as an avid sports fan for a local sports team, that user profile may correspond to a section in the manifest that contains EBIF widgets to display "purchase tickets" options.

As another example, in step 605, the user device's request to the new location may be made via a different protocol from one used for the initial delivery of the MPEG streams. For example, the MPEG streams in FIG. 5 may be transmitted as DOCSIS data streams, while the request for the manifest file and secondary content may be made via Internet Protocol messaging. Different physical network connections may be used as well. For example, the initial MPEG streams may be received via a fiber/coaxial cable connection, and the user device may use a wireless cellular data connection to retrieve the actual manifest file and the identified secondary content. Similarly, the request for the secondary content item files in step 607 may also be done using different protocols and/or physical connections.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device, a data stream comprising data indicating a location of a current version of a schedule of secondary content that is to be output during one or more breaks in primary content;
determining that the location of the current version is different from a previous location of the schedule of secondary content;
after determining that the location of the current version is different, obtaining the current version of the schedule of secondary content from the location of the current version; and
based on the current version of the schedule, causing output of the primary content and output of the secondary content.

2. The method of claim 1, further comprising:
selecting, based on a geographical region of the computing device, the location of the current version of the schedule of secondary content from a plurality of locations corresponding to a plurality of different schedules of secondary content,
wherein the plurality of different schedules are customized for different geographical regions.

3. The method of claim 1, further comprising:
selecting, based on a demographic group associated with a user of the computing device, the location of the current version from a plurality of locations corresponding to a plurality of different schedules of secondary content,
wherein the plurality of different schedules are customized for different user demographic groups.

4. The method of claim 1, further comprising:
selecting, based on a current time of day, the location of the current version from a plurality of locations corresponding to a plurality of different schedules of secondary content,
wherein the plurality of different schedules are customized for different times of day to output the primary content.

5. The method of claim 1, further comprising:
selecting the location of the current version from a plurality of locations corresponding to a plurality of different schedules of secondary content,
wherein the plurality of different schedules are customized for different content services associated with the primary content.

6. The method of claim 1, wherein the location of the current version is an Internet address, and wherein the obtaining the current version comprises sending a request to the Internet address.

7. The method of claim 1, wherein the obtaining comprises sending, using a protocol different from a protocol used to receive the data stream, a request to the location of the current version.

8. The method of claim 1, wherein the causing comprises causing output of the secondary content during the one or more breaks in the primary content.

9. The method of claim 1, wherein the data stream is a Moving Picture Experts Group (MPEG) transport stream, and wherein an elemental stream of the MPEG transport stream comprises the data indicating the location of the current version of the schedule.

10. The method of claim 1, wherein the location of the current version of the schedule is a uniform resource locator (URL) and the schedule is a manifest file.

11. A method comprising:
receiving, by a computing device, a data stream comprising primary content and data indicating a manifest file address;
based on determining that the manifest file address is different from a previous manifest file address used by the computing device, obtaining, based on the manifest file address, a schedule of secondary content that is to be output with the primary content; and
causing, based on the schedule, output of the primary content and the secondary content.

12. The method of claim 11, wherein the manifest file address is an Internet address, and wherein the obtaining the schedule comprises sending a request to the Internet address.

13. The method of claim 11, further comprising:
selecting, based on a type of the computing device, the manifest file address from a plurality of addresses corresponding to a plurality of different schedules of secondary content,
wherein the plurality of different schedules are customized for different types of computing devices.

14. The method of claim 11, further comprising:
selecting, based on a type of the primary content, the manifest file address from a plurality of addresses corresponding to a plurality of different schedules of secondary content,
wherein the plurality of different schedules are customized for different types of the primary content.

15. The method of claim 11, wherein the causing comprises:
determining a plurality of sections in the schedule applicable to different computing devices;
selecting, from the plurality of sections in the schedule, a particular section of the schedule associated with the computing device; and
causing, based on the selected particular section of the schedule, output of the primary content and the secondary content.

16. The method of claim 11, further comprising:
selecting, based on a current time of day, the manifest file address from a plurality of addresses corresponding to a plurality of different schedules of secondary content,
wherein the plurality of different schedules are customized for different times of day to output the primary content.

17. The method of claim 11, further comprising:
selecting, based on a type of the primary content, the manifest file address from a plurality of addresses corresponding to a plurality of different schedules of secondary content,
wherein the plurality of different schedules are customized for different types associated with the primary content.

18. The method of claim 11, wherein the obtaining comprises sending, using a protocol different from a protocol used to receive the data stream, a request to the manifest file address.

19. The method of claim 11, wherein the causing comprises causing output of the secondary content during a break in the primary content.

20. The method of claim 11, wherein the manifest file address is a uniform resource locator (URL).

21. An apparatus comprising:
one or more processors; and
memory storing instructions that, when executed by the one or more processors, cause the apparatus to:
receive a data stream comprising data indicating a location of a current version of a schedule of secondary content that is to be output during one or more breaks in primary content;
based on determining that the location of the current version is different from a previous location of the schedule of secondary content, obtain the current version of the schedule of secondary content from the location of the current version; and
based on the current version of the schedule, cause output of the primary content and output of the secondary content.

22. The apparatus of claim 21, wherein the instructions, when executed by the one or more processors, further cause the apparatus to:
select, based on a geographical region of the apparatus, the location of the current version of the schedule of secondary content from a plurality of locations corresponding to a plurality of different schedules of secondary content,
wherein the plurality of different schedules are customized for different geographical regions.

23. The apparatus of claim 21, wherein the instructions, when executed by the one or more processors, further cause the apparatus to:
select, based on a demographic group associated with a user of the apparatus, the location of the current version from a plurality of locations corresponding to a plurality of different schedules of secondary content,
wherein the plurality of different schedules are customized for different user demographic groups.

24. The apparatus of claim 21, wherein the instructions, when executed by the one or more processors, further cause the apparatus to:
select, based on a current time of day, the location of the current version from a plurality of locations corresponding to a plurality of different schedules of secondary content,
wherein the plurality of different schedules are customized for different times of day to output the primary content.

25. The apparatus of claim 21, wherein the instructions, when executed by the one or more processors, further cause the apparatus to:
select the location of the current version from a plurality of locations corresponding to a plurality of different schedules of secondary content,
wherein the plurality of different schedules are customized for different content services associated with the primary content.

26. The apparatus of claim 21, wherein the location of the current version is an Internet address, and wherein the current version is obtained by sending a request to the Internet address.

27. The apparatus of claim 21, wherein the instructions, when executed by the one or more processors, further cause the apparatus to:
send, using a protocol different from a protocol used to receive the data stream, a request to the location of the current version.

28. The apparatus of claim 21, wherein the instructions, when executed by the one or more processors, further cause the apparatus to:
cause output of the secondary content during the one or more breaks in the primary content.

29. The apparatus of claim 21, wherein the data stream is a Moving Picture Experts Group (MPEG) transport stream, and wherein an elemental stream of the MPEG transport stream comprises the data indicating the location of the current version of the schedule.

30. The apparatus of claim 21, wherein the location of the current version of the schedule is a uniform resource locator (URL) and the schedule is a manifest file.

31. An apparatus comprising:
one or more processors; and
memory storing instructions that, when executed by the one or more processors, cause the apparatus to:
receive a data stream comprising primary content;
extract, from the data stream, data indicating a manifest file address;
based on determining that the manifest file address is different from a previous manifest file address used by the apparatus, obtain, based on the manifest file address, a schedule of secondary content that is to be output with the primary content; and cause, based on the schedule, output of the primary content and the secondary content.

32. The apparatus of claim 31, wherein the manifest file address is an Internet address, and wherein the instructions, when executed by the one or more processors, cause the apparatus to obtain the schedule by sending a request to the Internet address.

33. The apparatus of claim 31, wherein the instructions, when executed by the one or more processors, further cause the apparatus to:

select, based on a type of the apparatus, the manifest file address from a plurality of addresses corresponding to a plurality of different schedules of secondary content, wherein the plurality of different schedules are customized for different types of user devices.

34. The apparatus of claim 31, wherein the instructions, when executed by the one or more processors, further cause the apparatus to:

select, based on a type of the primary content, the manifest file address from a plurality of addresses corresponding to a plurality of different schedules of secondary content, wherein the plurality of different schedules are customized for different types of the primary content.

35. The apparatus of claim 31, wherein the instructions, when executed by the one or more processors, further cause the apparatus to:

determine a plurality of sections in the schedule applicable to different user devices;

select, from the plurality of sections in the schedule, a particular section of the schedule associated with the apparatus; and cause, based on the selected particular section of the schedule, output of the primary content and the secondary content.

36. The apparatus of claim 31, wherein the instructions, when executed by the one or more processors, further cause the apparatus to:

select, based on a current time of day, the manifest file address from a plurality of addresses corresponding to a plurality of different schedules of secondary content, wherein the plurality of different schedules are customized for different times of day to output the primary content.

37. The apparatus of claim 31, wherein the instructions, when executed by the one or more processors, further cause the apparatus to:

select, based on a type of the primary content, the manifest file address from a plurality of addresses corresponding to a plurality of different schedules of secondary content, wherein the plurality of different schedules are customized for different types associated with the primary content.

38. The apparatus of claim 31, wherein the instructions, when executed by the one or more processors, further cause the apparatus to:

send, using a protocol different from a protocol used to receive the data stream, a request to the manifest file address.

39. The apparatus of claim 31, wherein the instructions, when executed by the one or more processors, further cause the apparatus to:

cause output of the secondary content during a break in the primary content.

40. The apparatus of claim 31, wherein the manifest file address is a uniform resource locator (URL).

41. The method of claim 1, wherein determining that the location of the current version is different comprises determining that a manifest file has been moved from one location to another location.

* * * * *